(12) United States Patent
Sejimo (10) Patent No.: US 11,312,021 B2
(45) Date of Patent: Apr. 26, 2022

(54) CONTROL APPARATUS, ROBOT SYSTEM, AND CONTROL METHOD

(71) Applicant: Seiko Epson Corporation, Tokyo (JP)

(72) Inventor: Isamu Sejimo, Azumino (JP)

(73) Assignee: Seiko Epson Corporation

( * ) Notice: Subject to any disclaimer, the term of this patent is extended or adjusted under 35 U.S.C. 154(b) by 316 days.

(21) Appl. No.: 16/546,420

(22) Filed: Aug. 21, 2019

(65) Prior Publication Data

US 2020/0061842 A1 Feb. 27, 2020

(30) Foreign Application Priority Data

Aug. 22, 2018 (JP) .............................. JP2018-155224

(51) Int. Cl.
*B25J 13/08* (2006.01)
*B25J 9/16* (2006.01)

(52) U.S. Cl.
CPC ........... *B25J 13/085* (2013.01); *B25J 9/1628* (2013.01)

(58) Field of Classification Search
CPC ...... B25J 13/085; B25J 9/1628; B25J 9/1633; B25J 9/161; B25J 19/02
USPC ................................................ 700/245–264
See application file for complete search history.

(56) References Cited

U.S. PATENT DOCUMENTS

| | | | | |
|---|---|---|---|---|
| 4,725,826 A * | 2/1988 | Hunter | ................... | B25J 13/083 |
| | | | | 294/907 |
| 5,189,624 A * | 2/1993 | Barlow | ............ | G05B 19/41895 |
| | | | | 700/169 |
| 9,364,951 B1 * | 6/2016 | De Sapio | ................... | B25J 9/16 |
| 2009/0018700 A1 * | 1/2009 | Okamoto | ............... | B25J 9/1612 |
| | | | | 700/260 |
| 2016/0052135 A1 * | 2/2016 | Motoyoshi | ............. | B25J 9/1633 |
| | | | | 29/281.6 |
| 2016/0167231 A1 * | 6/2016 | Nakayama | ............. | B25J 9/1676 |
| | | | | 700/255 |
| 2016/0346935 A1 * | 12/2016 | Nakayama | ............. | B25J 13/087 |
| 2016/0354928 A1 * | 12/2016 | Shimodaira | ............ | B25J 9/1679 |
| 2016/0361125 A1 * | 12/2016 | Balicki | .................... | B25J 19/06 |
| 2017/0008171 A1 * | 1/2017 | Iwatake | ................. | B25J 9/1687 |
| 2017/0080562 A1 | 3/2017 | Tsuzaki | | |

(Continued)

FOREIGN PATENT DOCUMENTS

| | | |
|---|---|---|
| JP | 2007-326163 A | 12/2007 |
| JP | 2017-056549 A | 3/2017 |

*Primary Examiner* — Jaime Figueroa
(74) *Attorney, Agent, or Firm* — Harness, Dickey & Pierce, P.L.C.

(57) ABSTRACT

When a predetermined stop condition is satisfied when a movable unit is in contact with an object in force control, a control apparatus stops the movable unit, and, when a predetermined restart condition is satisfied after stoppage of the movable unit, the control apparatus executes separation control to separate the movable unit from the object, and then, executes resetting of the force detection unit and restarts the force control after execution of the resetting. In another aspect, when a predetermined stop condition is satisfied when the movable unit is in contact with an object in the force control, the control apparatus performs separation control to separate the movable unit from the object, and then, stops the movable unit, and, when a predetermined restart condition is satisfied after stoppage of the movable unit, the control apparatus executes resetting of the force control, and then, restarts the force control.

9 Claims, 8 Drawing Sheets

(56) References Cited

U.S. PATENT DOCUMENTS

2017/0312919 A1* 11/2017 Saito .................... G06F 11/1438
2017/0341239 A1* 11/2017 Nakayama ........... B25J 19/0091
2018/0272535 A1* 9/2018 Ogawa .................. B25J 9/1692
2020/0078941 A1* 3/2020 Oka ....................... B25J 9/1666

* cited by examiner

CONTROL APPARATUS, ROBOT SYSTEM, AND CONTROL METHOD

The present application is based on, and claims priority from, JP Application Serial Number 2018-155224, filed Aug. 22, 2018, the disclosure of which is hereby incorporated by reference herein in its entirety.

BACKGROUND

1. Technical Field

The present disclosure relates to a control apparatus for robot, robot system, and control method.

2. Related Art

As robots, robots that perform force control using force detection units are known. Generally, when force control is performed, the force detection unit is reset before start of the force control, and thereby, an operation of initializing a reference output value of the force detection unit is executed. JP-A-2017-56549 discloses a technique of immediately stopping the operation when an interruption command is received during execution of the force control.

However, the inventor of this application found that, when the operation is stopped during execution of the force control, the reference output value of the force detection unit shifts during the stop and accurate force control may be hard in the restarted operation.

SUMMARY

According to an aspect of the present disclosure, a control apparatus that controls a robot including a movable unit and a force detection unit that detects a force applied to the movable unit is provided. The control apparatus includes a control section that force-controls the movable unit according to output of the force detection unit, in a case where a predetermined stop condition is satisfied when the movable unit is in contact with an object in the force control, the control section stops the force control, and, when a predetermined restart condition is satisfied after stoppage of the movable unit, the control section executes separation control to separate the movable unit from the object, and then, executes resetting of the force detection unit and restarts the force control after execution of the resetting.

According to another aspect of the present disclosure, a control apparatus that controls a robot including a movable unit and a force detection unit that detects a force applied to the movable unit is provided. The control apparatus includes a control section that force-controls the movable unit according to output of the force detection unit, in a case where a predetermined stop condition is satisfied when the movable unit is in contact with an object in the force control, the control section performs separation control to separate the movable unit from the object, and then, stops the movable unit, and, when a predetermined restart condition is satisfied after stoppage of the movable unit, the control section executes resetting of the force detection unit, and then, restarts the force control.

DESCRIPTION OF EXEMPLARY EMBODIMENTS

A. First Embodiment

Figure 1:
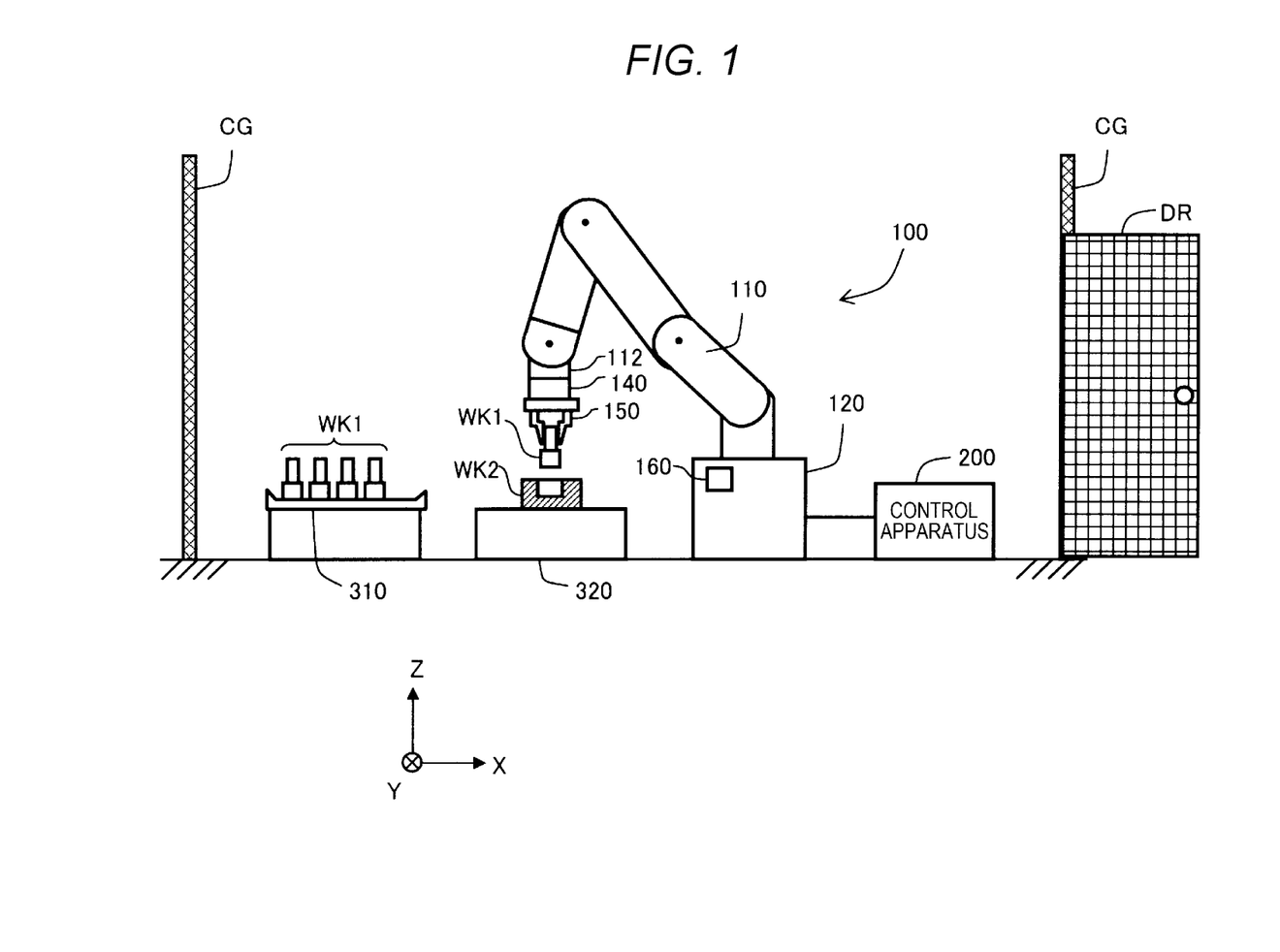
FIG. 1 is an explanatory diagram of a configuration example of a robot system.

FIG. 1 is an explanatory diagram showing an example of the robot system. The robot system includes a robot 100 and a control apparatus 200. The robot 100 executes fitting work of gripping a first work WK1 held in a tray 310 and inserting the first work WK1 in a concave portion of a second work WK2 on a table 320. The work area of the robot 100 is surrounded by a safety fence CG. A safety door DR through which a human can come and go is provided in the safety fence CG. A signal indicating an opening or closing state of the safety door DR is supplied to the control apparatus 200. FIG. 1 shows three directions X, Y, Z perpendicular to one another. The X-direction and the Y-direction are horizontal directions and the Z-direction is a vertical direction. These directions are shown in the other drawings as appropriate.

The robot 100 includes an arm 110 and a base 120. The arm 110 is sequentially coupled using six joints. A force detection unit 140 and a hand 150 as an end effector are attached to an arm end 112 as a distal end portion of the arm 110. The hand 150 is a gripper that grips an object. In the embodiment, a six-axis robot is exemplified, however, a robot having an arbitrary arm mechanism having one or more joints can be used. In this specification, a mechanism combining the arm 110 and the hand 150 is also referred to as "movable unit". Or, a part including a work gripped by the hand 150 in addition to the arm 110 and the hand 150 can be also referred to as "movable unit".

The force detection unit 140 is a six-axis force sensor that measures an external force applied to the hand 150 as the end effector. The force detection unit 140 has three detection axes orthogonal to one another in a sensor coordinate system as an intrinsic coordinate system, and detects magnitude of forces parallel to the respective detection axes and magnitude of torque (moment of forces) about the respective detection axes. The forces parallel to the respective detection axes are referred to as "translational forces". Further, the torque about the respective detection axes is referred to as "rotational forces". In this specification, the term "force" is used in the meaning including both the translational force and the rotational force.

The force detection unit 140 is not necessarily a sensor that detects forces along six axes, but a sensor that detects forces along a smaller number of axes. Further, instead of providing the force detection unit 140 at the distal end of the arm 110, a force sensor as the force detection unit may be provided in any one or more joints of the arm 110. Note that it is only necessary that "force detection unit" has a function of detecting a force. That is, "force detection unit" may be a device that directly detects a force like a force sensor, or a device that indirectly detects a force like an IMU (Inertial Measurement Unit) or a device detecting a force from a current value of an actuator of the arm 110. Further, "force detection unit" may be externally provided for the robot 100 or provided inside of the robot 100.

An object detection unit 160 that detects an object approaching the robot 100 is provided in the base 120. As the object detection unit 160, e.g. a proximity sensor such as a milli-meter wave radar or light curtain can be used. When an object approaches within a predetermined distance threshold value, the object detection unit 160 generates an output signal indicating the approach of the object to the control apparatus 200. The object detection unit 160 may be provided in an arbitrary number in arbitrary locations of the robot 100. For example, it is preferable to provide a plurality of object detection units 160 to detect approach of an object over the whole range of 360 degrees around the robot 100.

Figure 2:
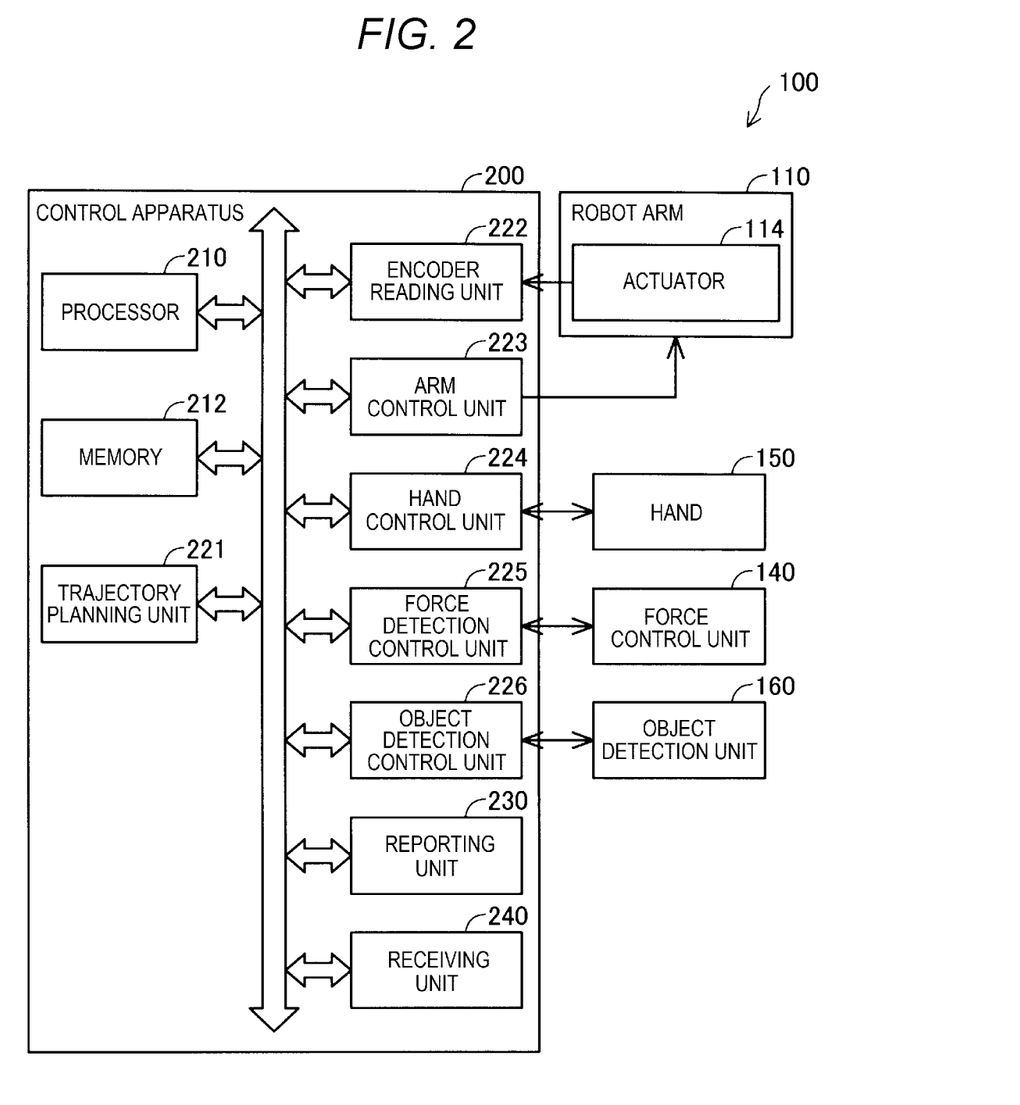
FIG. 2 is a functional block diagram of a robot and a control apparatus.

FIG. 2 is a block diagram showing functions of the robot 100 and the control apparatus 200. A plurality of actuators 114 for driving the plurality of joints are provided in the arm 110 of the robot 100. An encoder (not shown) is provided in each actuator 114.

The control apparatus 200 has a processor 210, a memory 212, a trajectory planning unit 221, an encoder reading unit 222, an arm control unit 223 that controls the arm 110, a hand control unit 224 that controls the hand 150, a force detection control unit 225 that controls the force detection unit 140, an object detection control unit 226 that controls the object detection unit 160, a reporting unit 230 that reports to a human, and a receiving unit 240 that receives input by a worker. The encoder reading unit 222 and the arm control unit 223 move the arm 110 by controlling the actuators 114.

The control apparatus 200 that executes the functions of the respective units 221 to 226 corresponds to "control section". Part of the respective units 221 to 226, 230, 240 of the control apparatus 200 may be realized by the processor 210 executing computer programs stored in the memory 212. In this case, the processor 210 corresponds to "control section".

In the memory 212, work programs for proceeding with work of the robot 100 are stored. The processor 210 reads the work program stored in the memory 212, gives instructions to the trajectory planning unit 221, the arm control unit 223, the hand control unit 224, and the force detection control unit 225, determines the execution results, and thereby, proceeds with work of the robot 100. When the work is started, the processor 210 controls the trajectory planning unit 221 to create a trajectory of the arm 110 according to the work program. The trajectory planning unit 221 generates the trajectory containing a larger number of coordinate points from information of a plurality of taught points contained in the work program. The arm control unit 223 operates the arm 110 according to the trajectory supplied from the trajectory planning unit 221. The encoder reading unit 222 acquires position information of the arm 110 using the output signals of the encoders of the plurality of actuators 114 of the arm 110, and feeds the information back to the arm control unit 223. When an instruction is given to the hand control unit 224 according to the work program, gripping or releasing operations of an object is performed.

The reporting unit 230 reports a warning or the like to a human nearby the robot 100. As the reporting unit 230, one or more reporting devices including a speaker that reports using sound and a lamp or display device that reports using light can be used.

Note that, as the configuration of the control apparatus 200, various other configurations than the configuration shown in FIG. 2 can be employed. For example, the processor 210 and the memory 212 may be removed from the control apparatus 200 in FIG. 1 and the processor 210 and the memory 212 may be provided in another apparatus communicably connected to the control apparatus 200. In this case, the whole apparatus combining the other apparatus and the control apparatus 200 functions as a control apparatus of the robot 100. In another embodiment, the control apparatus 200 may have two or more processors 210. In yet another embodiment, the control apparatus 200 may be realized by a plurality of apparatuses communicably connected to one another. In these various embodiments, the control apparatus 200 is configured as an apparatus or apparatus group including one or more processors 210.

Figure 3A:
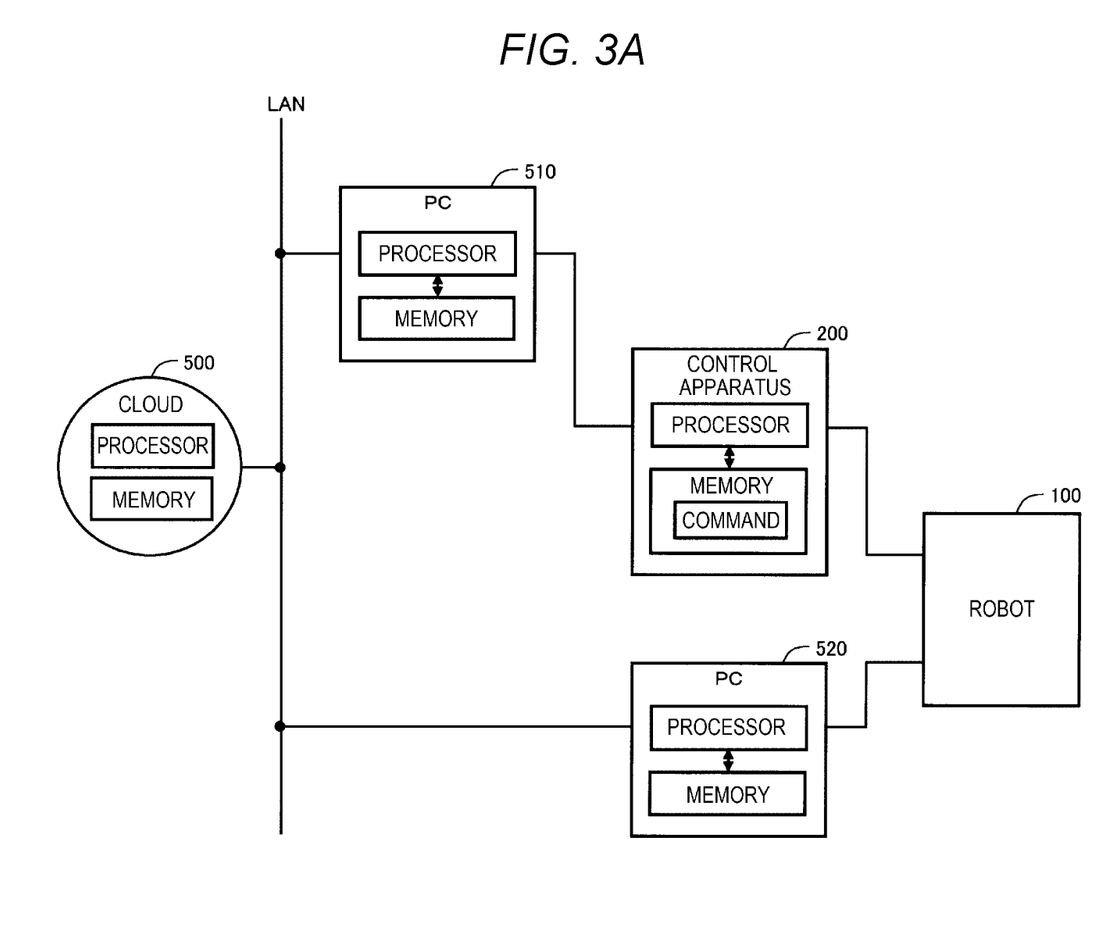
FIG. 3A is a conceptual diagram showing an example of the control apparatus having a plurality of processors.

FIG. 3A is the conceptual diagram showing the example of the control apparatus configured by a plurality of processors. In this example, in addition to the robot 100 and the control apparatus 200, personal computers 510, 520 and a cloud service 500 provided via a network environment such as LAN are drawn. Each of the personal computers 510, 520 includes a processor and a memory. In the cloud service 500, a processor and a memory are also available. The control apparatus of the robot 100 can be realized using part or all of the plurality of processors.

Figure 3B:
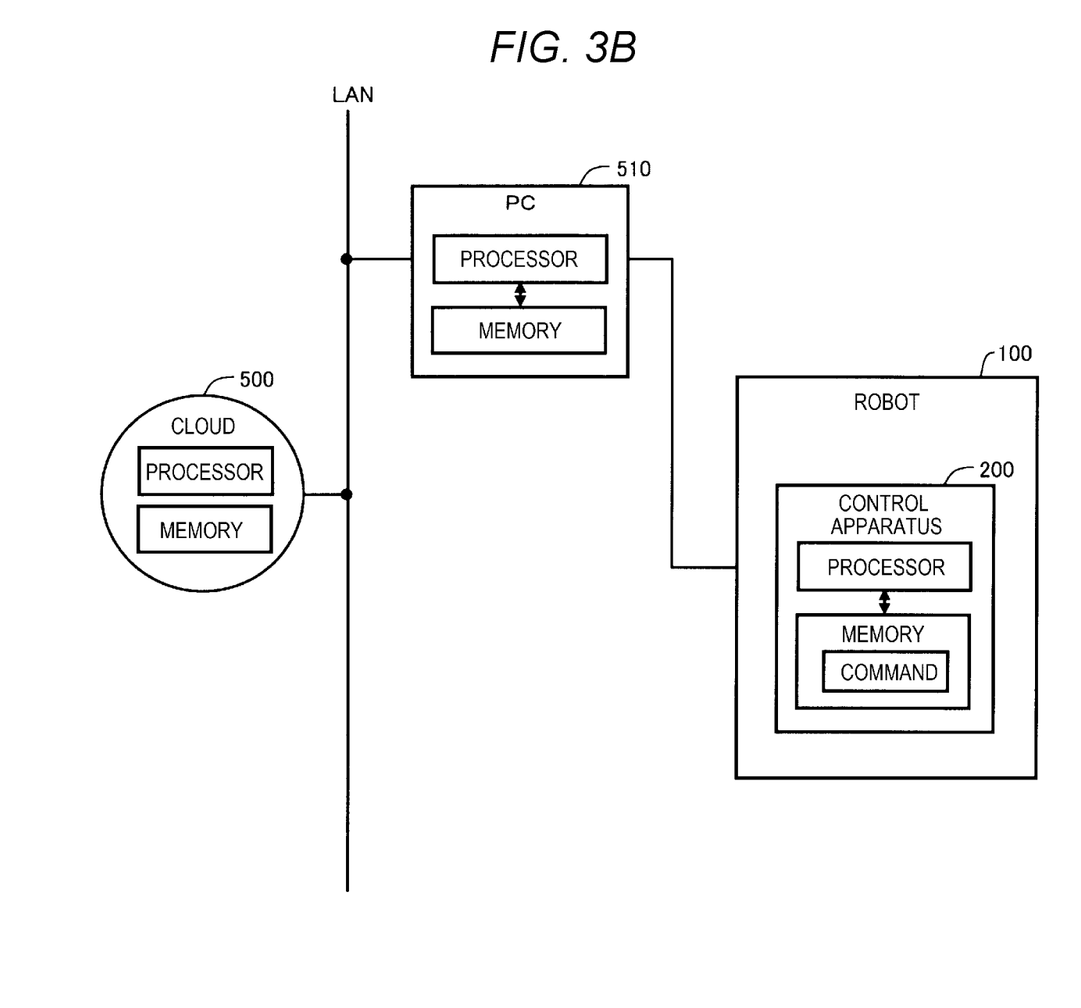
FIG. 3B is a conceptual diagram showing another example of the control apparatus having a plurality of processors.

FIG. 3B is the conceptual diagram showing another example of the control apparatus configured by a plurality of processors. This example is different from that in FIG. 3A in that the control apparatus 200 of the robot 100 is housed in the robot 100. Also, in this example, the control apparatus of the robot 100 can be realized using part or all of the plurality of processors.

Figure 4:
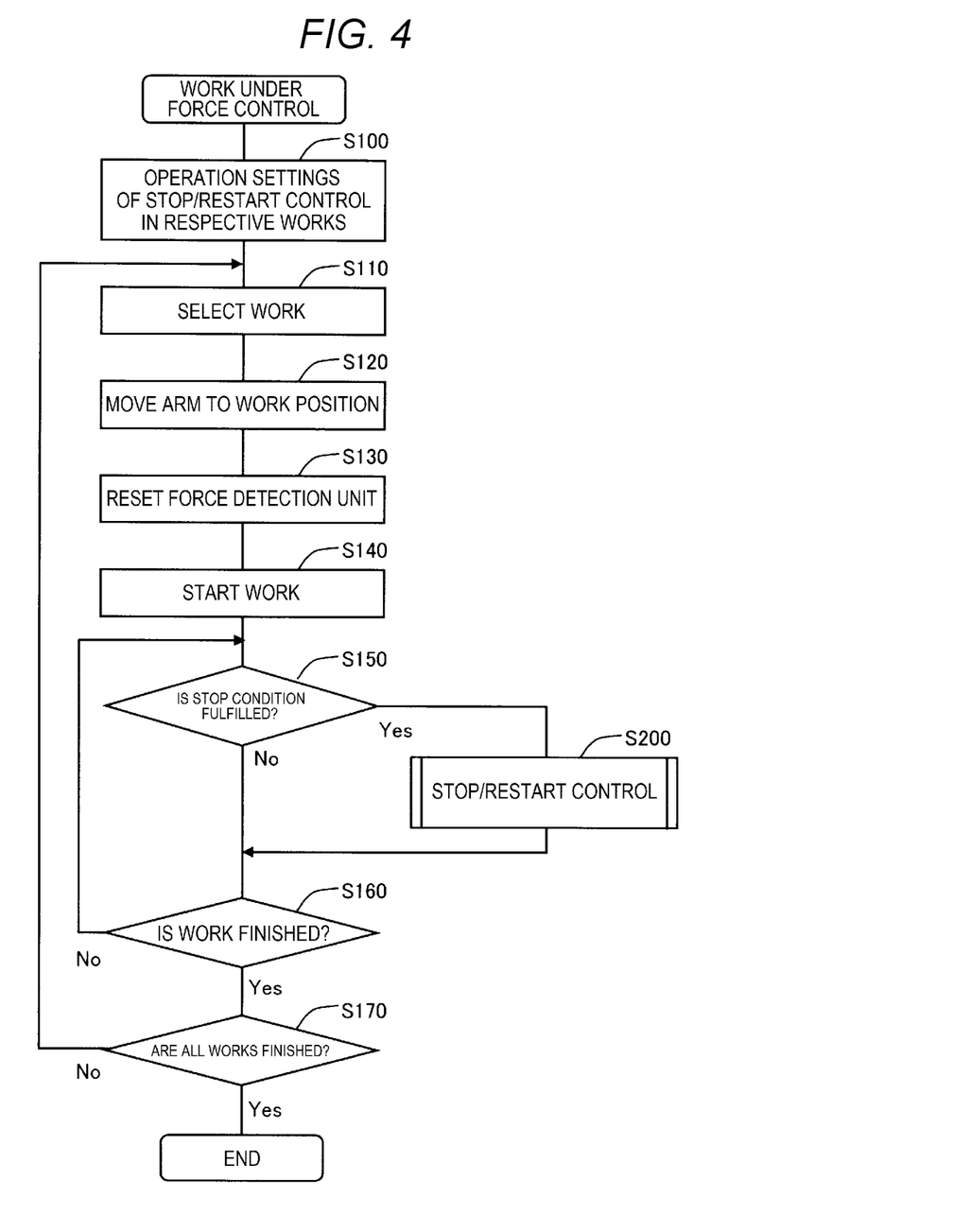
FIG. 4 is a flowchart showing a work procedure of the robot.

FIG. 4 is the flowchart showing a procedure of work using force control of the robot 100. Here, a case where the control apparatus 200 controls the robot 100 according to a work program containing a plurality of works is assumed. "Work program" is also referred to as "work sequence".

At step S100, operations in stop/restart control in the respective works are set. "Stop/restart control" is control performed at step S200, which will be described later, when the robot 100 is stopped. The details of the stop/restart control and settings of the operations under the control will be explained at step S200.

At step S110, a single work is selected and, at step S120, the arm 110 is moved to a start position of the work. At step S130, the force detection unit 140 is reset. By the resetting, output reference values for the respective axes of the force detection unit 140 are initialized to zero. After the resetting of the force detection unit 140, the work is started at step S140.

At step S150, whether or not a predetermined stop condition is fulfilled is determined. The stop condition may be set to be fulfilled when one of the following conditions 1, 2 is fulfilled, for example:

<Condition 1> The safety door DR is opened.
<Condition 2> The object detection unit 160 detects an object at a distance equal to or smaller than a predetermined distance threshold value.

Note that another condition than the conditions 1, 2 may be used as the stop condition.

When the stop condition is fulfilled, the process moves to step S200 and the stop/restart control is executed. On the other hand, when the stop condition is not fulfilled, the work continues without change and the process moves to step S160. At step S160, whether or not the work is finished is determined, and, when the work is not finished, the process returns to step S150. When the work is finished at step S160, the process moves to step S170 and whether or not all works of the work program are finished is determined. When not all works are finished, the process returns to step S110 and repeats processing at step S110 and the subsequent steps.

Figure 5:
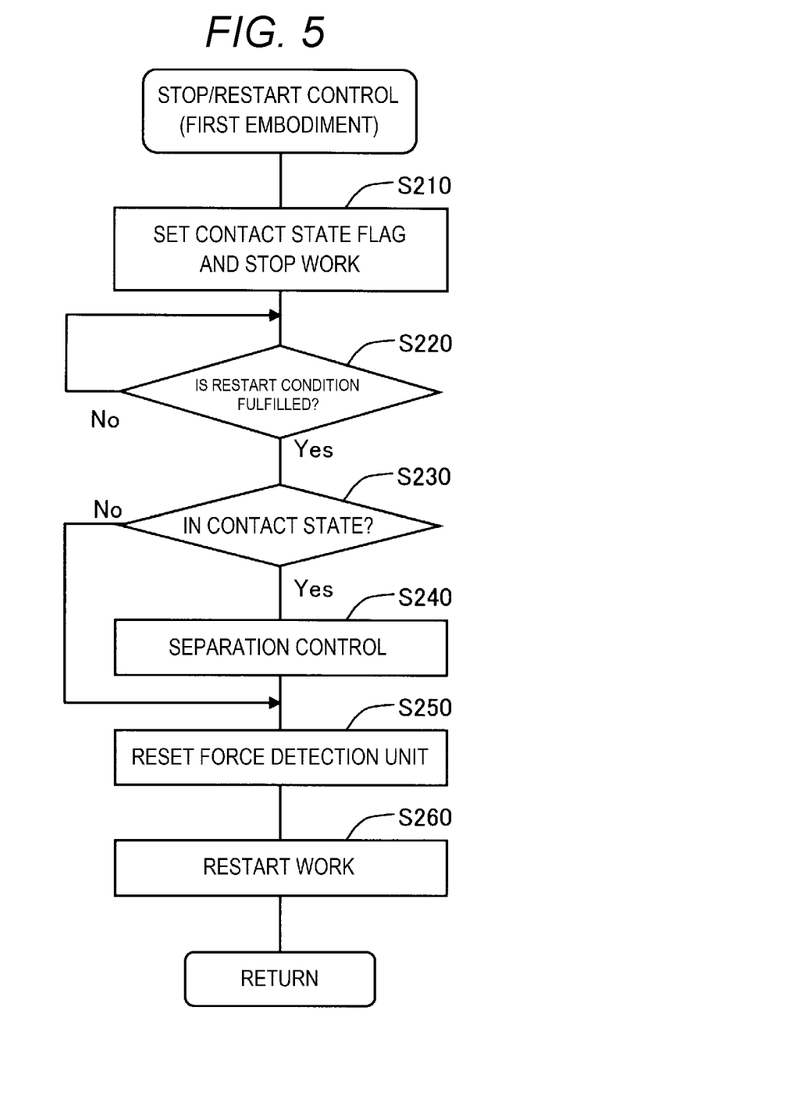
FIG. 5 is a flowchart showing a detailed procedure of stop/restart control in a first embodiment.

FIG. 5 is the flowchart showing the detailed procedure of the stop/restart control in the first embodiment. At step S210, a contact state flag is set and the work is stopped. "Contact state flag" is a value indicating whether or not a movable unit of the robot 100 is in contact with an object when the stop condition is fulfilled. In the embodiment, "movable unit" is a part including the arm 110, the hand 150, and the first work WK1, and "object" is a second work WK2. Whether or not the movable unit is in contact with the object is determined according to whether or not a force detected by the force detection unit 140 is equal to or larger than a predetermined force threshold value. When the movable unit of the robot 100 is in contact with the object, the contact state flag is set to "1" and, when the unit is not in contact, the contact state flag is set to "0". The contact state flag is stored in the memory 212.

At step S220, whether or not a predetermined restart condition is fulfilled is determined. For example, the restart condition is that the stop condition fulfilled at step S150 in FIG. 4 is unfulfilled. Specifically, for example, when the safety door DR is closed again, the restart condition is fulfilled. When the restart condition is not fulfilled, the process stands by and, when the restart condition is fulfilled, the process moves to step S230. At step S230, whether or not the unit is in the contact state when the work is stopped is determined. The determination is performed by referring to the value of the contact state flag set at step S210.

When the unit is not in the contact state when the work is stopped, separation control at step S240 is skipped and the process moves to step S250. On the other hand, when the unit is in the contact state when the work is stopped, the process moves to step S240 and executes the separation control. The separation control is control to separate the movable unit of the robot 100 from the object. Specifically, in FIG. 1, the arm 110 is operated to separate the first work WK1 gripped by the hand 150 from the second work WK2 as the object. In the separation control, a position to which the arm 110 is separated is preset at step S100 in FIG. 4. As configurations of the separation control that can be set for the respective works, e.g. the following various configurations can be used.

First Configuration of Separation Control

The position of the movable unit is stored in the memory 212 during execution of the force control, position control is performed according to the position of the movable unit stored in the memory 212, and thereby, the movable unit is separated from the object.

The first configuration corresponds to control of reversely moving the movable unit along the trajectory. According to the first configuration, the movable unit is separated from the object according to the position of the movable unit stored in the memory 212, and thereby, the potential of causing defects in the movable unit and the object due to the separation control may be reduced.

Second Configuration of Separation Control

Position control based on a pre-taught retracting operation is executed, and thereby, the movable unit is separated from the object.

As the retracting operation, for example, an operation of moving the arm 110 to a designated retraction position may be taught. According to the second configuration, the movable unit is separated from the object based on the pre-taught retracting operation, and thereby, the potential of causing defects in the movable unit and the object due to the separation control may be reduced.

Third Configuration of Separation Control

Force control with a target force in a direction perpendicular to a direction in which the movable unit is separated as zero is executed, and thereby, the movable unit is separated from the object.

In the example of FIG. 1, "separation direction" is the Z-direction and "direction perpendicular to the separation direction" is the X-direction and the Y-direction. According to the third configuration, the movable unit is separated from the object according to the force control with the target force in the direction perpendicular to the direction in which the movable unit is separated as zero, and thereby, the potential of causing defects in the movable unit and the object due to the separation control may be reduced. Note that, as a superordinate concept of the third configuration, a configuration that "force control with a target force in a direction perpendicular to a direction in which the movable unit is separated smaller than a target force in the separation direction is executed" may be employed. According to the configuration, the movable unit is separated from the object according to the force control with the target force in the direction perpendicular to the direction in which the movable unit is separated smaller than the target force in the separation direction, and thereby, the potential of causing defects in the movable unit and the object due to the separation control may be reduced.

The receiving unit 240 receives settings of parameters of separation control in the respective plurality of works. Specifically, the unit receives selection of the configurations of the separation control of the respective works and settings of parameters necessary for execution of the configurations. As the configurations of the separation control, other various configurations than the above described three configurations may be used.

At step S250, the force detection unit 140 is reset and, at step S260, the work is restarted.

As described above, in the first embodiment, in the case where the predetermined stop condition is satisfied when the movable unit is in contact with the object in the force control, the movable unit is stopped. Further, the predetermined restart condition is satisfied after the movable unit is stopped, the separation control to separate the movable unit from the object is executed, then, resetting of the force detection unit 140 is executed, and the force control is started after execution of the resetting. In other words, after the movable unit is stopped in the force control, the movable unit is separated from the object, then, the resetting of the force detection unit 140 is executed before restart of the force control, and thereby, the output reference value of the force detection unit 140 may be set to a proper value and accurate force control can be performed.

B. Second Embodiment

Figure 6:
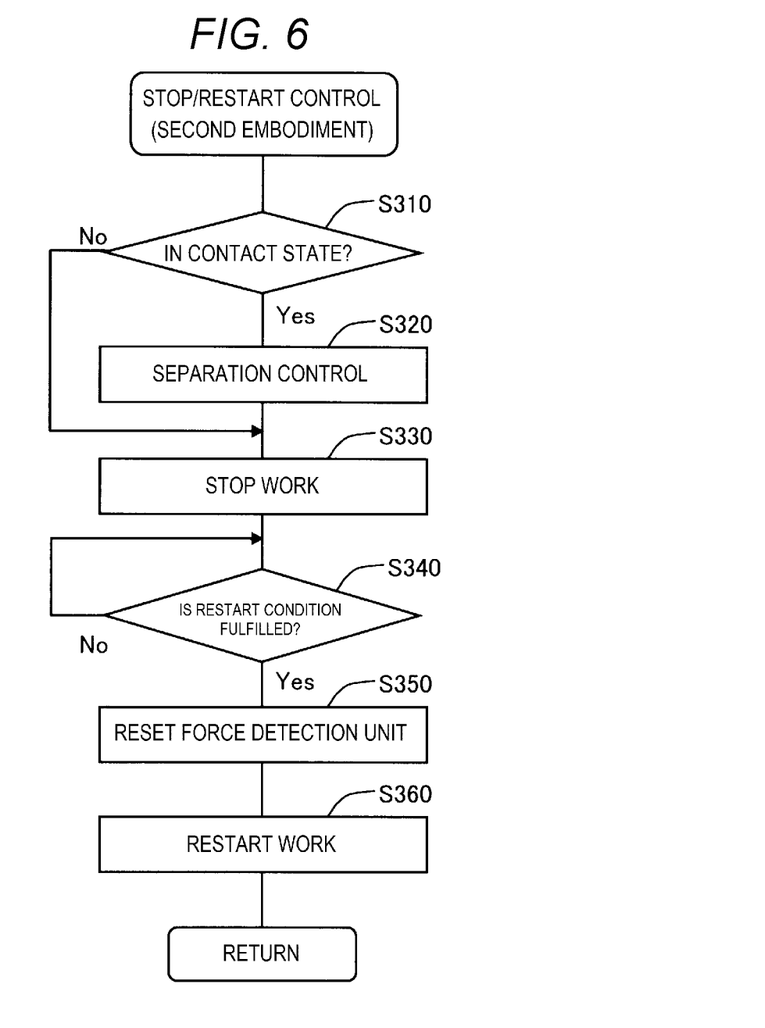
FIG. 6 is a flowchart showing a detailed procedure of stop/restart control in a second embodiment.

FIG. 6 is the flowchart showing the detailed procedure of stop-restart control in the second embodiment. The second embodiment is different from the first embodiment only in the procedure of the stop/restart control, and the same as the first embodiment in the apparatus configuration and the processing procedure of the entire work explained in FIG. 4.

The stop/restart control in FIG. 6 is different from that in FIG. 5 mainly in that the separation control is executed before stoppage of the work.

At step S310, whether or not the movable unit is in contact with the object when the stop condition is fulfilled is determined. When the unit is in contact, the separation control is performed at step S320, and then, the work is stopped at step S330. As the configuration of the separation control, various configurations can be used like the first embodiment. On the other hand, when the unit is not in contact, step S320 is skipped, and the process moves to step S330 and the work is immediately stopped.

At step S340, whether or not the predetermined restart condition is fulfilled is determined. When the restart condition is not fulfilled, the process stands by and, when the restart condition is fulfilled, the process moves to step S350. At step S350, the force detection unit 140 is reset and, at step S360, the work is restarted.

As described above, in the second embodiment, in the case where the predetermined stop condition is satisfied when the movable unit is in contact with the object in the force control, the separation control to separate the movable unit from the object is performed, and then, the movable unit is stopped. Further, when the predetermined restart condition is satisfied after stoppage of the movable unit, resetting of the force detection unit 140 is executed, and then, the force control is restarted. In other words, the movable unit is separated from the object before the movable unit is stopped in the force control, and then, resetting of the force detection unit 140 is executed before restart of the force control. As a result, the output reference value of the force detection unit 140 may be set to a proper value and accurate force control can be performed.

C. Third Embodiment

Figure 7:
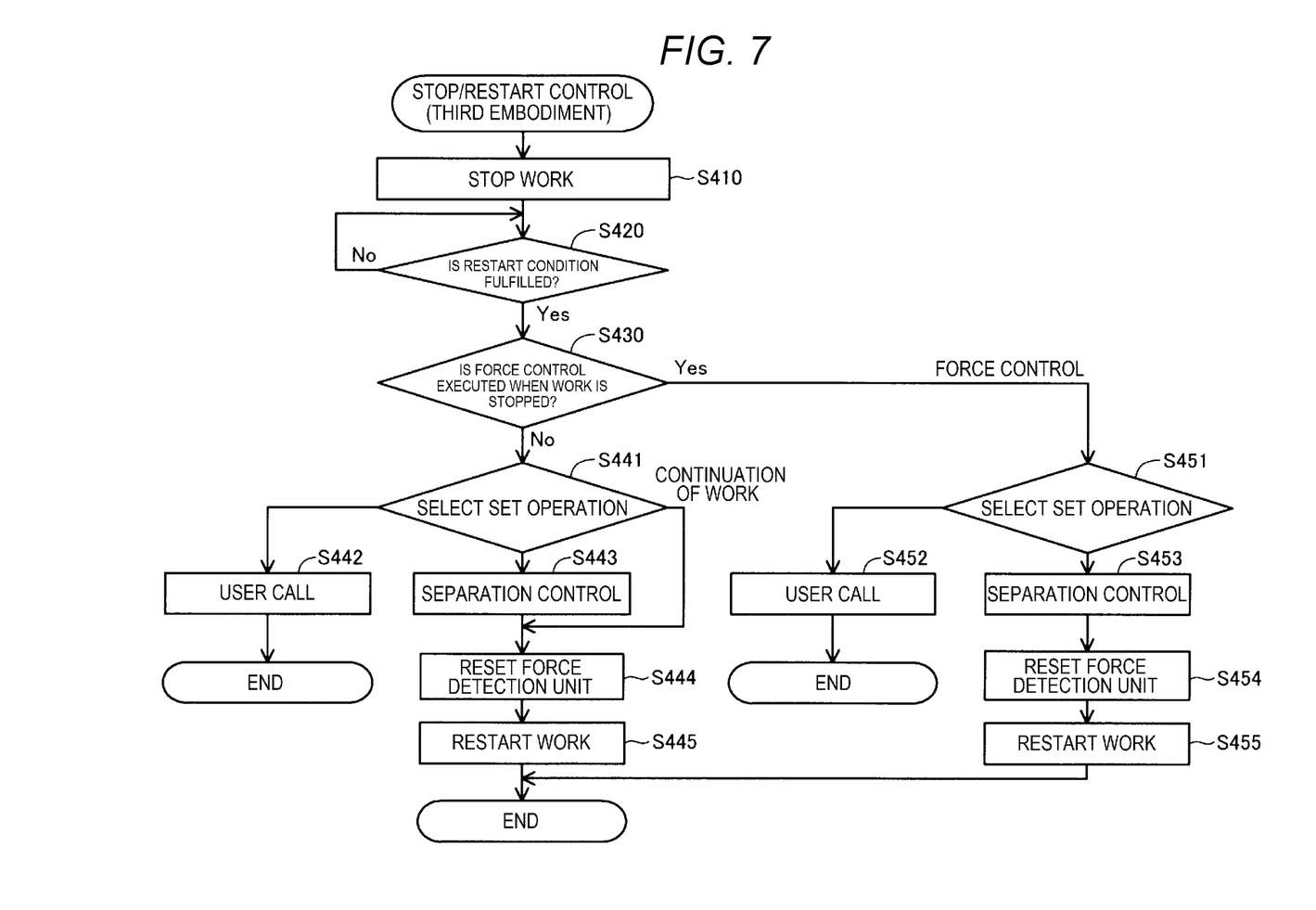
FIG. 7 is a flowchart showing a detailed procedure of stop/restart control in a third embodiment.

FIG. 7 is the flowchart showing the detailed procedure of stop/restart control in the third embodiment. The third embodiment is different from the first embodiment only in the procedure of the stop-restart control, and the same as the first embodiment in the apparatus configuration and the processing procedure of the entire work explained in FIG. 4.

When the stop condition is fulfilled at step S150 in FIG. 4, the process moves to step S410 in FIG. 7 and the work is stopped. At step S420, whether or not the predetermined restart condition is fulfilled is determined. The determination is the same as that at step S220 in FIG. 5. At step S430, whether or not force control is executed when the work is stopped. Whether or not force control is executed is determined according to whether or not a force detected by the force detection unit 140 is equal to or larger than a predetermined force threshold value or determined from the work program selected at step S110. When the force control is not executed when the work is stopped, steps S441 to S445 are executed. On the other hand, when the force control is executed when the work is stopped, steps S451 to S455 are executed.

When the force control is not executed when the work is stopped, at step S441, one operation set at step S100 in FIG. 4 is selected. In the example of FIG. 7, the operations that can be set when the force control is not executed when the work is stopped are three operations of user call, separation control, and continuation of work.

When the user call is selected as the set operation, the user call is executed at step S442. "User call" is a warning for reporting that some trouble occurs in the robot 100 to the worker and executed by the reporting unit 230 in FIG. 2. As the user call, a warning such as blinking of a lamp or sounding a buzzer is used.

When the separation control is selected as the set operation, the separation control is performed at step S443, and then, the force detection unit 140 is reset at step S444 and the work is restarted at step S445.

When the continuation of work is selected as the set operation, step S443 is skipped, the process moves to step S444 and the force detection unit 140 is reset, and the work is restarted at step S445.

On the other hand, when the force control is executed when the work is stopped, the process moves to step S451 and one operation set at step S100 in FIG. 4 is selected. In the example of FIG. 7, the operations that can be set when the force control is not executed when the work is stopped are two operations of user call and separation control.

When the user call is selected as the set operation, the user call is executed at step S452. On the other hand, when the separation control is selected as the set operation, the separation control is performed at step S453, and then, the force detection unit 140 is reset at step S454 and the work is restarted at step S455.

The procedure of the above described steps S451 to S454 is substantially the same procedure of the steps S230 to S260 in FIG. 5 of the first embodiment. That is, according to the procedure of the above described steps S451 to S454, when the force control is executed when the work is stopped, the separation control to separate the movable unit from the object is executed before restarting of the work, and then, resetting of the force detection unit 140 is executed and the force control is restarted after execution of the resetting. As a result, the output reference value of the force detection unit 140 may be set to a proper value and accurate force control can be performed.

Note that, in the third embodiment, like the second embodiment, when the predetermined stop condition is fulfilled, the separation control to separate the movable unit from the object may be performed before the movable unit is stopped at step S410. In this case, the separation control at steps S443, S453 in FIG. 7 can be omitted.

D. Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the respective following aspects can be replaced or combined as appropriate for solving part or all of the problems of the present disclosure or achieving part or all of the effects of the present disclosure. Further, the technical features can be deleted as appropriate unless the technical features are explained as essential features in this specification.

(1) According to a first aspect of the present disclosure, a control apparatus that controls a robot including a movable unit and a force detection unit that detects a force applied to the movable unit is provided. The control apparatus includes a control section that force-controls the movable unit according to output of the force detection unit, and, in a case where a predetermined stop condition is satisfied when the movable unit is in contact with an object in the force control, the control section stops the force control and, when a predetermined restart condition is satisfied after stoppage of the movable unit, executes separation control to separate the movable unit from the object, and then, executes resetting of the force detection unit and restarts the force control after execution of the resetting.

According to the control apparatus, before the force control is restarted after the movable unit is stopped in the force control, the object is separated from the movable unit and resetting of the force detection unit is executed, and thereby, an output reference value of the force detection unit may be set to a proper value and accurate force control can be performed.

(2) According to a second aspect of the present disclosure, a control apparatus that controls a robot including a movable unit and a force detection unit that detects a force applied to the movable unit is provided. The control apparatus includes a control section that force-controls the movable unit according to output of the force detection unit, and, in a case where a predetermined stop condition is satisfied when the movable unit is in contact with an object in the force control, the control section performs separation control to separate the movable unit from the object, and then, stops the movable unit and, when a predetermined restart condition is satisfied after stoppage of the movable unit, executes resetting of the force detection unit, and then, restarts the force control.

According to the control apparatus, when the movable unit is stopped in the force control, the object is separated from the movable unit and the movable unit is stopped, and then, resetting of the force detection unit is executed before restart of the force control. Thereby, the output reference value of the force detection unit may be set to a proper value and accurate force control can be performed.

(3) The control apparatus may include a memory unit that stores a position of the movable unit during execution of the force control, and the separation control may separate the movable unit according to the position of the movable unit stored in the memory unit.

According to the control apparatus, the movable unit is separated from the object according to the position of the movable unit stored in the memory unit, and thereby, the potential of causing defects in the movable unit and the object due to the separation control may be reduced.

(4) In the control apparatus, the separation control may separate the movable unit based on a pre-taught retracting operation.

According to the control apparatus, the movable unit is separated from the object based on the pre-taught retracting operation, and thereby, the potential of causing defects in the movable unit and the object due to the separation control may be reduced.

(5) In the control apparatus, the separation control may be force control with a target force in a direction perpendicular to a direction in which the movable unit is separated set to be smaller than a target force in the separation direction.

According to the control apparatus, the movable unit is separated from the object according to the force control with the target force in the direction perpendicular to the direction in which the movable unit is separated smaller than the target force in the separation direction, and thereby, the potential of causing defects in the movable unit and the object due to the separation control may be reduced.

(6) In the control apparatus, a work sequence of the robot may include a plurality of works, and the control apparatus may include a receiving unit that receives settings of positions to which the movable unit is separated in the separation control for the respective plurality of works.

According to the control apparatus, the positions to which the movable unit is separated may be set in the separation control for the respective plurality of works, and thereby, the movable unit may be separated to an appropriate position according to details of the work.

(7) According to a third aspect of the present disclosure, a robot system including a robot having a movable unit and a force detection unit that detects a force applied to the movable unit, and the above described control apparatus is provided.

According to the robot system, the output reference value of the force detection unit may be set to a proper value and accurate force control can be performed.

(8) According to a fourth aspect of the present disclosure, a robot is provided. The robot includes a force detection unit that detects a force and a movable unit force-controlled according to output of the force detection unit, in a case where a predetermined stop condition is satisfied when the movable unit is in contact with an object in the force control, the movable unit stops an operation and, when a predetermined restart condition is satisfied after stoppage of the movable unit, the movable unit is separated from the object, resetting of the force detection unit is executed after the separation, and then, and the force control is restarted.

According to the robot, before the force control is restarted after the movable unit is stopped in the force control, the object is separated from the movable unit and resetting of the force detection unit is executed, and thereby, the output reference value of the force detection unit may be set to a proper value and accurate force control can be performed.

(9) According to a fifth aspect of the present disclosure, a robot is provided. The robot includes a force detection unit that detects a force and a movable unit force-controlled according to output of the force detection unit, in a case where a predetermined stop condition is satisfied when the movable unit is in contact with an object in the force control, the movable unit separates from the object, and then, stops an operation, and, when a predetermined restart condition is satisfied after stoppage of the movable unit, resetting of the force detection unit is executed, and then, the force control is restarted.

According to the robot, when the movable unit is stopped in the force control, the object is separated from the movable unit and the movable unit is stopped, and then, resetting of the force detection unit is executed before restart of the force control. Thereby, the output reference value of the force detection unit may be set to a proper value and accurate force control can be performed.

The present disclosure can be realized in other various aspects than the above described aspects. For example, the present disclosure may be realized in aspects of a robot system including a robot and a robot control apparatus, a computer program for realizing functions of the robot control apparatus, a non-transitory storage medium recording the computer program, or the like.

What is claimed is:

1. A control apparatus that controls a robot including a movable member and a force detection sensor that detects a force applied to the movable member, the control apparatus comprising:
a memory configured to store a program; and
a processor configured to execute the program so as to:
cause the movable member to move toward an object;

cause the movable member to start work with the object using force control, the force control being performed based on a signal from the force detection sensor;

receive the signal from the force detection sensor to determine whether the movable member contacts the object;

detect whether a safety door for the robot is open;

stop the movement of the movable member when the processor determines that the movable member contacts the object and the safety door is open;

cause the movable member to move away from the object when the processor detects that the safety door is closed;

reset the force detection sensor after the movable member is positioned away from the object; and cause the movable member to re-start the work with the object using the force control after the processor resets the force detection sensor.

2. A control apparatus that controls a robot including a movable member and a force detection sensor that detects a force applied to the movable member, the control apparatus comprising:

a memory configured to store a program; and a processor configured to execute the program so as to:

cause the movable member to move toward an object;

cause the movable member to start work with the object using force control, the force control being performed based on a signal from the force detection sensor;

receive the signal from the force detection sensor to determine whether the movable member contacts the object;

detect whether a safety door for the robot is open;

cause the movable member to move away from the object when the processor determines that the movable member contacts the object and the safety door is open;

cause the movable member to stop after the movable member is positioned away from the object;

reset the force detection sensor when the processor detects that the safety door is closed; and cause the movable member to re-start the work with the object using the force control after the processor resets the force detection sensor.

3. The control apparatus according to claim 1, wherein the memory is configured to store a position of the movable member during execution of the force control, and the processor is configured to cause the movable member to move away from the object according to the position of the movable member stored in the memory.

4. The control apparatus according to claim 1, wherein the processor is configured to cause the movable member to move away from the object based on a pre-taught retracting operation.

5. The control apparatus according to claim 1, wherein, when the movable member moves away from the object in a separation direction, the processor uses the force control with a target force in a direction perpendicular to the separation direction set to be smaller than a target force in the separation direction.

6. The control apparatus according to claim 1, wherein the work includes a plurality of works as a work sequence, and the processor is configured to receive positions of the movable member at which the movable member is positioned away from the object with respect to the respective plurality of works.

7. A robot system comprising:

a robot including the movable member and the force detection sensor; and the control apparatus according to claim 1.

8. A control method for causing a processor to execute a program stored in a memory, the control method comprising executing on the processor the steps of:

cause a movable member of a robot to move toward an object;

cause the movable member to start work with the object using force control, the force control being performed based on a signal from a force detection sensor;

receive the signal from the force detection sensor to determine whether the movable member contacts the object;

detect whether a safety door for the robot is open;

stop the movement of the movable member when the processor determines that the movable member contacts the object and the safety door is open;

cause the movable member to move away from the object when the processor detects that the safety door is closed;

reset the force detection sensor after the movable member is positioned away from the object; and cause the movable member to re-start the work with the object using the force control after the processor resets the force detection sensor.

9. A control method for causing a processor to execute a program stored in a memory, the control method comprising executing on the processor the steps of:

cause a movable member of a robot to move toward an object;

cause the movable member to start work with the object using force control, the force control being performed based on a signal from a force detection sensor;

receive the signal from the force detection sensor to determine whether the movable member contacts the object;

detect whether a safety door for the robot is open;

cause the movable member to move away from the object when the processor determines that the movable member contacts the object and the safety door is open;

cause the movable member to stop after the movable member is positioned away from the object;

reset the force detection sensor when the processor detects that the safety door is closed; and cause the movable member to re-start the work with the object using the force control after the processor resets the force detection sensor.

* * * * *